Aug. 6, 1929.  R. W. SCOTT  1,723,816
ATTACHMENT FOR WIRE ROPE AND MEANS FOR TESTING SAME
Filed March 9, 1926  2 Sheets-Sheet 1
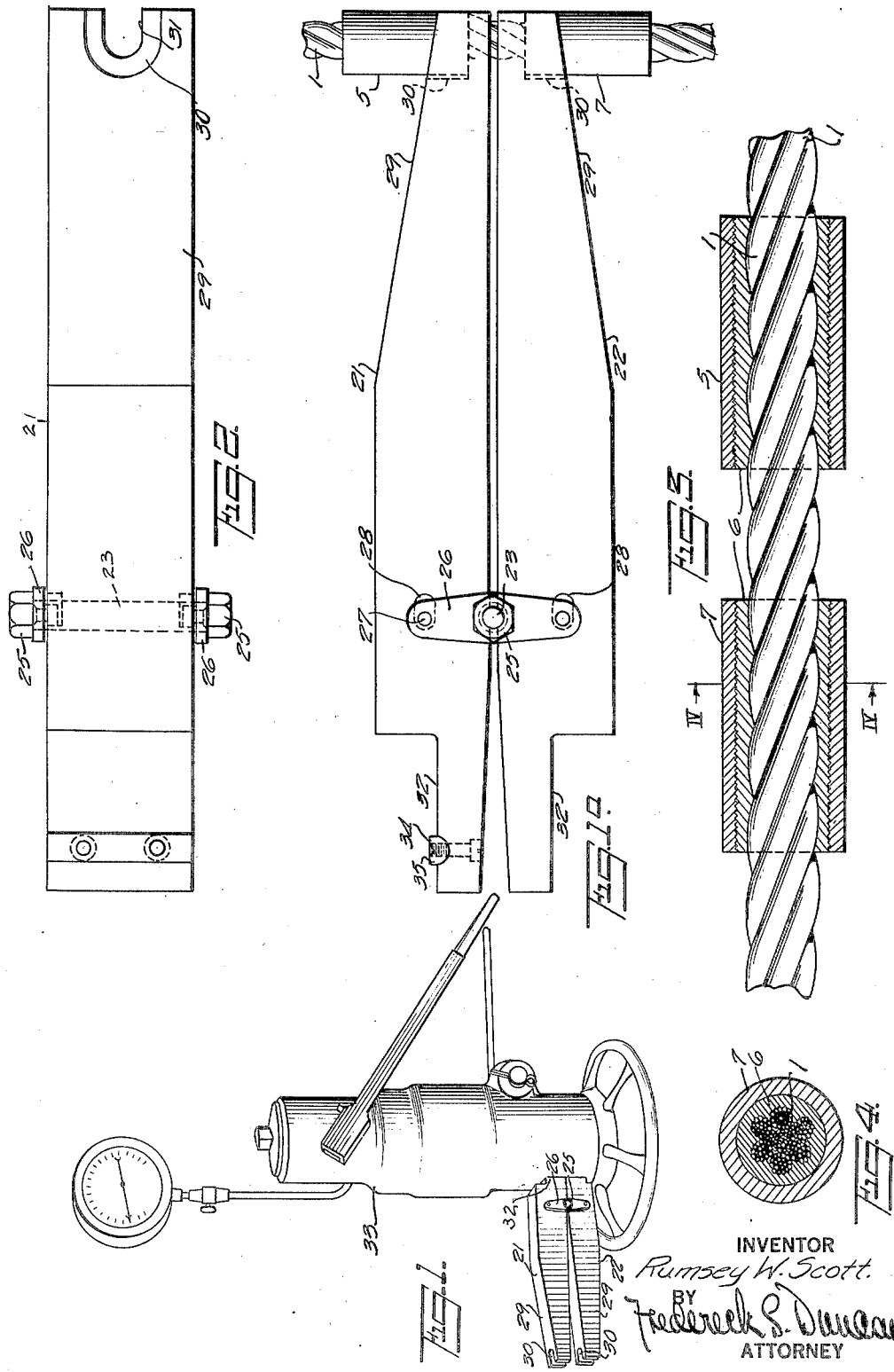

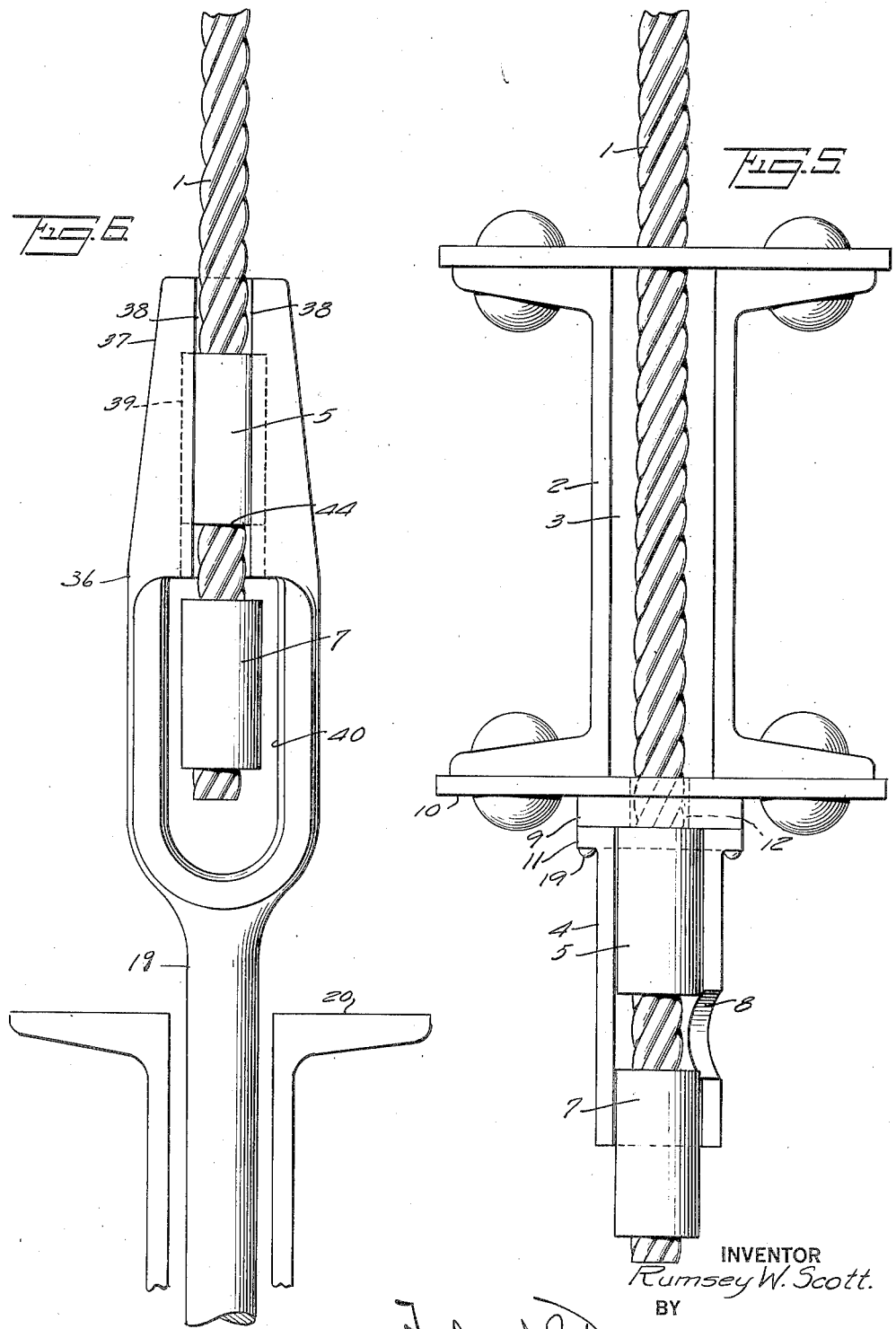

Patented Aug. 6, 1929.

1,723,816

UNITED STATES PATENT OFFICE.

RUMSEY W. SCOTT, OF MONTCLAIR, NEW JERSEY, ASSIGNOR TO AMERICAN CABLE COMPANY, INC., A CORPORATION OF DELAWARE.

ATTACHMENT FOR WIRE ROPE AND MEANS FOR TESTING SAME.

Application filed March 9, 1926. Serial No. 93,379.

This invention relates to methods and appliances for testing the strength of wire ropes and of attachments secured thereto and is of particular utility when utilized for field tests of fittings attached to elevator ropes, although I contemplate the use of the invention wherever it may be employed advantageously by reason of the nature of my improvements.

No method is in use at the present day for proof-testing such attachments, but it is highly desirable that their latent defects should be detected, and serious accidents averted, for many fittings attached in the field to a wire rope are not 100% efficient, and some have developed a holding power of only 30% of the strength of the rope.

An important object of the invention, accordingly, is to provide a method of testing such fittings or attachments that may be carried into effect conveniently in the field, or wherever it is desired to perform such tests, and a cognate object of the invention is to provide a form of fitting which will lend itself readily to the performance of such proof tests, and a powerful testing appliance for carrying the method into effect.

The primary object of the invention, however, is to furnish manufacturers and users of such fittings with a trustworthy means to demonstrate the reliability of fittings whose structural details and mode of attachment are of approved character, so that the performance of different types of fittings may be evidenced and documented in such a manner as to permit the establishment of definite standards of manufacture and to certify those fittings which have been shown by the proof test to conform with the requirements of said standards.

The above objects, and other features of the invention, will be illustrated and described fully in the accompanying drawings and specification and set forth in the claims.

In the drawings,

Fig. 1 is a view in side elevation of a testing appliance in the construction of which this invention has been embodied, the same being shown in its operative relation with a suitable operating press, and Fig. 1ª is an elevation of the testing device on a larger scale, showing also a section of elevator rope to be tested, the latter being provided with a fitting of improved construction to facilitate such testing.

Fig. 2 is a plan view of the testing device, isolated, and shown upon the same scale as Fig. 1ª.

Fig. 3 is a detail view on a larger scale in longitudinal section of the fitting shown in Fig. 1ª.

Fig. 4 is a view in transverse section on the line IV—IV of Fig. 3.

Fig. 5 is a view in longitudinal vertical section of the beam connection on an elevator car and showing also in elevation a wire rope forming part of the elevator rope, with an attachment embodying the fitting shown in Figs. 1ª and 3.

Fig. 6 is a view similar to Fig. 5 of a modified form of connection.

In the illustrated embodiment, the part designated by the reference numeral 1 is a wire rope of the type customarily employed for supporting an elevator car, and 2 (see Fig. 5) is an I-beam of composite structure, similar to those usually forming part of the top structure of the car, having a vertical opening 3 through which the elevator rope passes to a connecting device designated in its entirety by the reference numeral 4.

This connecting device may be of any construction suitable to effect connection between the wire rope 1 and the beam 2, and also to permit inspection of the fitting without displacing the wire rope from its operative position.

In the instance illustrated, as a convenient form of construction for the above purpose, I have shown at 4 what may be termed a flanged container comprising a cylindrical member of steel adapted to surround the lower portion of the wire elevator rope and having a central bore sufficiently large to permit the use upon the rope of an attachment sleeve 5 secured firmly upon the rope by any suitable method. I have illustrated as a now preferred form of attachment for this purpose a sleeve of the type shown in the patent to Arthur J. Briggs, No. 1,643,110 issued September 20, 1927, in which patent this sleeve is claimed generically, and is, therefore, claimed herein only in combination with other features of the present invention.

In Fig. 3, I have shown one of these sleeves in section, the reference numeral 5 designating the outer sleeve or member of the attachment, which may be, and preferably is, of steel, compacted upon a lining 6 of a relatively softer metal, such as aluminum, suitable to fill the peripheral interstices of the wire rope and to effect a very strong union of the attachment thereto.

In pursuance of my invention, I have provided the rope with an auxiliary sleeve or member 7, preferably similar in construction to the member 5 just described, and these two sleeves are preferably spaced apart approximately at the distance illustrated in the drawings, the space between them being situated preferably opposite a side opening 8, (see Fig. 5) formed in the walls of the container 4 to permit observation of the sleeves and the portion of the rope 1 therebetween for the purpose of determining whether or not there has been any relative slippage between the rope and its attachment. I have shown a washer or transverse member 9 interposed between the lower horizontal plate 10 of the I-beam 2, and the container 4, and the latter is preferably provided with a flange 11, the washer serving to distribute the load sustained by the wire rope, which passes through an aperture 12 in the washer of sufficient diameter to permit the rope to pass, but which is less in diameter than the exterior diameter of either of the sleeves 5 or 7, so that the sleeve 5 sustains the load of the I-beam and the car or any other structure which the wire rope is designed to support.

The cylindrical container serves to confine the enclosed portion of the rope and the sleeves, preventing any whipping action or lateral displacement, and I prefer to secure it rigidly in the position illustrated, by suitable means, such as the screws 19 running through the flange 11 and washer 9 into the plate 10.

If the car is over-loaded, or for any other reason the attachment sleeve 5 is subjected to a load which it was not designed to carry, or if the attachment has not been properly secured to the wire rope in the process of installation, the wire rope may slip in the attachment and the effect will be to draw the outer sleeve 7 inwardly with the rope, and the space between the sleeve 7 and the sleeve 5 will be lessened. This change may be readily detected by inspection through the opening 8.
If the slippage reaches a sufficient extent, the attachment member 7 will be brought into contact with the member 5, so that the load will be supported by the member 7, which has not slipped.
In order to detect the possibility of such slippages in the use of the wire rope, and thus to permit the same to be averted, my invention provides a novel method for proof-testing the efficiency of the fittings composed of the members 5 and 7, and in its preferred form this method is carried into effect by the use of an appliance which can be readily transported for use in the field.

The preferred appliance for this purpose comprises a pair of tongs of a design suitable to co-operate with the fittings above described, although any form of appliance suitable for this purpose may be utilized, and any suitable device for actuating the testing appliance may be provided.

The appliance shown in Figs. 1, 1a and 2 comprises a pair of levers 21 and 22 adapted to work pivotally upon a fulcrum shaft 23, which takes the form of a bolt having retaining nuts 25 at each end thereof, the latter serving also as retaining means for links 26 on each side of the levers, these links being provided with studs 27 which enter slots or recesses 28 formed in the side faces of the levers 21 and 22 respectively.

Each of the levers has a jaw 29 recessed at 30 to seat one of the members 5 or 7 of the fitting hereinbefore described, and the jaws are grooved as indicated at 31 to furnish a clearance space for the wire rope 1, as shown clearly in Fig. 1a. At the opposite end of the levers, arms 32 are provided preferably of suitable contour to fit between the jaws of a portable hydraulic press 33, the construction of which need not be described in detail as the specific structure illustrated is not essential for carrying the method into successful practice.

One of the jaws may be provided with a suitable device 34 to localize the contact of the arms with one of the jaws of the press, this device embodying a contact strip 35 adapted to co-operate with the contacting portion of the jaw of the press. A definite ratio between the lever arms is thus insured, and the lever arms 21 and 22 are of suitable proportions relatively to the operating arms 32 to reduce the pressure applied to the fittings 5 and 7 in a predetermined ratio corresponding to the desired factor of safety of the fitting.

When the proof-test is to be made in a shop, or in the field, before installation of the rope and its fitting, the rope and its fittings are inserted in the appliance as shown in Fig. 1, the proper pressure is developed in the press, and if the fitting members 5 and 7 hold their position upon the wire rope 1 when the critical stress is developed by this proof-test the efficiency of the fitting is assured.

If one or both of the fitting members 5 and 7 moves relatively to the wire rope before the critical stress is developed, it is possible to replace the sleeves by others and thus rectify the trouble without incurring any danger in the use of the rope and its fittings, as for example in the operation of an elevator.

The testing appliance may be utilized with even greater utility where the rope has been installed in connection with the elevator as illustrated and described with reference to the structure shown in Fig. 5.

It is only necessary in making a proof-test under such conditions to let off enough wire rope 1 to permit the portion of the rope carrying the fitting members 5 and 7 to be withdrawn from the flanged container 4 to an extent sufficient to permit introduction of the jaws 29 of the tester in the space intervening between the fittings 5 and 7, and after the proof-test has been completed, the rope and its fittings 5 and 7 may be drawn back into the position shown in Fig. 5 ready for further use if the attachment has met the proof-test.

If one or both of the fittings should part, the attachment members may be removed and replaced by attachments suitably strong to bear the load required, as already mentioned above.

I have shown in Fig. 6 a modified form of connection suitable for installations of a similar character, and only differing in detail of construction from that shown and described with reference to Fig. 5.

In the embodiment illustrated in Fig. 6 the wire rope 1 and the attachment members 5 and 7 are similar in every detail to those shown and described with similar reference numerals in the above description. The numeral 20 indicates the structure of a composite I-beam which is sufficiently similar to the I-beam 2 not to require detailed description. The member 19 is a bolt upon which is formed integrally a socket 36 having a basket 37, slotted at 38 to receive the wire rope 1, and having grooved inner walls as indicated by dotted lines at 39 to form a space sufficiently large to receive the attachment sleeve 5 when the device is in place.

The opening 40 of the bale 36 of the socket is sufficient in size to afford clearance for the attachment member 7 and to facilitate the operation of inserting the rope and its attachments in place within the socket.

The assembled parts just described operate in exactly the same manner as those described with reference to Fig. 5, and any slippage of the wire rope within the member 5 may be readily detected by the diminution of the space between the neighboring ends of the members 5 and 7.

While I have shown a tester of preferred form, and also fittings of a particularly desirable character, it is to be understood that I do not limit myself to the specific structure and materials selected for illustration and description, inasmuch as the improved method of testing wire ropes and fittings is deemed by me to be broadly novel, and is therefore made the subject of generic claims herein. The fittings disclosed herein are claimed specifically in my copending divisional application, Ser. No. 192,917.

Having illustrated and described my invention thus fully and suitable means by which the same may be carried into effect, what I claim as new and desire to secure by Letters Patent is:—

1. In the method of proof-testing the holding efficiency of wire rope and attachments secured to rope, the steps which comprise securing permanently to said rope a plurality of attachment members and applying simultaneously thereto a force adapted to develop a stress bearing a predetermined ratio to that of the load which the attachment is designed to sustain.

2. An appliance of the class described, comprising a pair of levers hinged together upon a transverse pivot, and connected by links near each end of said pivot, one arm of each lever having a seat to receive the attachment member on a wire rope and one of said levers having on its other arm a contact member to determine the effective ratio of the arms.

In testimony whereof, I have signed this specification.

RUMSEY W. SCOTT.